(Model.)
C. A. FOSTER.
TWO WHEELED VEHICLE.
No. 290,563. Patented Dec. 18, 1883.
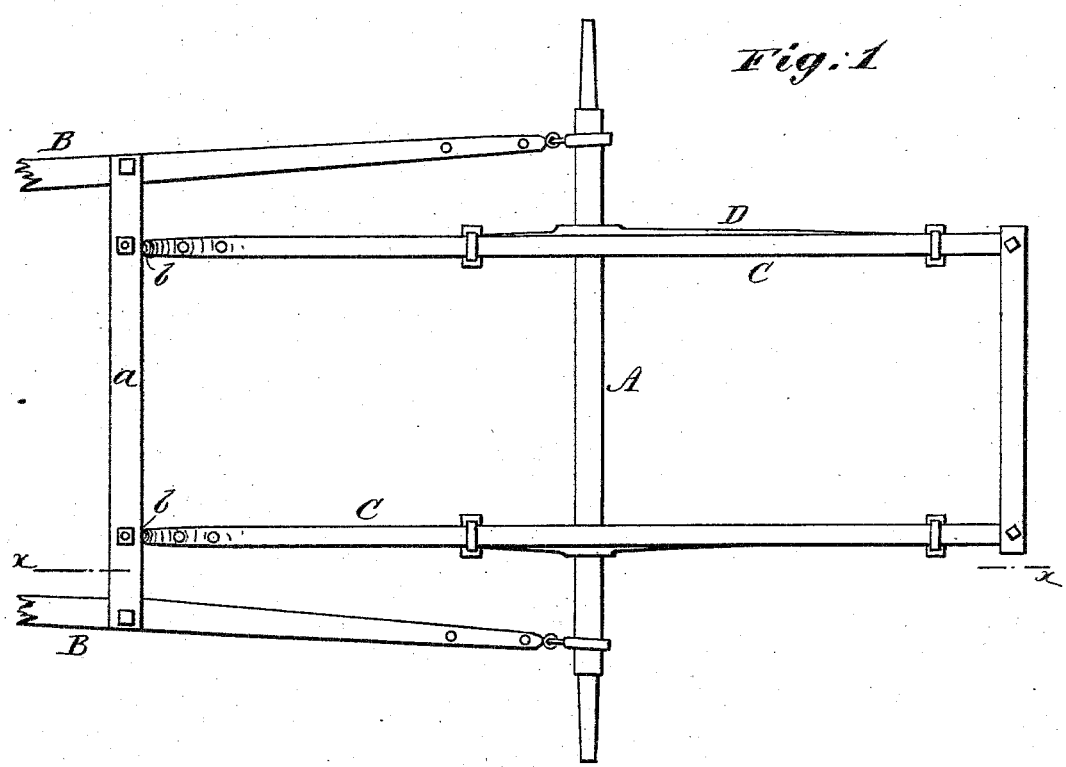
Fig. 1
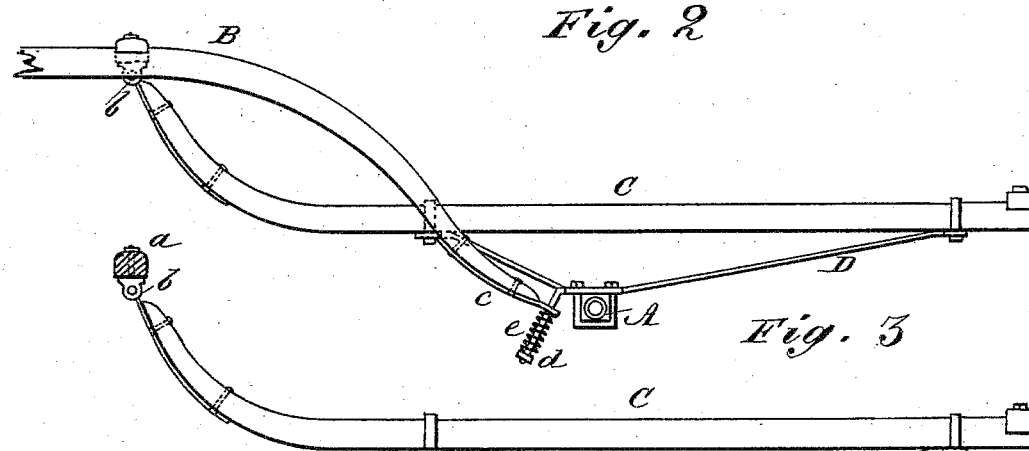
Fig. 2
Fig. 3
WITNESSES:
C. Neveux
C. Sedgwick
INVENTOR:
C. A. Foster
BY 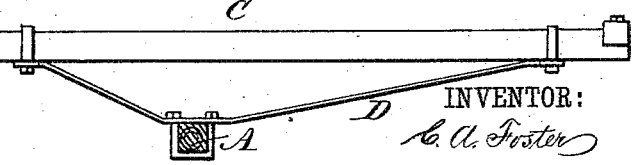
ATTORNEYS.

UNITED STATES PATENT OFFICE.

CHARLES A. FOSTER, OF ELKHART, INDIANA.

TWO-WHEELED VEHICLE.

SPECIFICATION forming part of Letters Patent No. 290,563, dated December 18, 1883.

Application filed June 1, 1883. (Model.)

*To all whom it may concern:*

Be it known that I, CHARLES A. FOSTER, of Elkhart, in the county of Elkhart and State of Indiana, have invented a new and useful Improvement in Carts, of which the following is a full, clear, and exact description.

The object of my improvement in carts is to construct the supports of the cart-box so that it shall not partake of the motion of the horse, for the purpose of making the vehicle easy-riding.

The invention consists in supporting-bars carried on the axle, and supporting the cart-body on springs, as hereinafter described and claimed.

Reference is to be had to the accompanying drawings, forming a part of this specification, in which similar letters of reference indicate corresponding parts in all the figures.

Figure 1 is a plan view of a cart of my improved construction, and Fig. 2 is a side view, and Fig. 3 a sectional side view on line $xx$ of Fig. 1.

A is the axle; B B, the shafts. C C are side bars, attached at their forward ends to the cross-bar $a$ of the shafts and extending to the rear above the axle, upon which they are supported by braces D D of metal or of wood. The box of the cart is to be attached on or between bars C by springs of ordinary character. At their forward ends the attachment of bars C to cross-bar $a$ is by knuckles $b$, and the shafts B are connected to the axle by straps $c$, having eyes that take over bolts $d$, fixed to the axle, so that the shafts are free to oscillate on the knuckle-joints $b$. A spiral spring, $e$, is fitted on the bolts $d$ beneath the straps $c$, so as to force the outer ends of the shafts downward to their normal position. By this construction the vehicle is made easy-riding, as the box will not partake of the up-and-down motion of the shafts.

A flat-bottomed box may be used, and, being hung between the side bars, it is free to play up and down without striking the axle. The box is also easily accessible.

Having thus described my invention, I claim as new and desire to secure by Letters Patent—

1. The axle A, the side bars, C, and the braces D, supporting the side bars on the axle and rigidly connecting said parts, in combination with the shafts B, the cross-bar $a$, connecting them and hinged to the forward ends of the side bars, C, the rear end of the shafts loosely connected to the axle to play vertically relative thereto, as described.

2. The combination, with the axle A, and the side bars, C, secured thereto, of the shafts B, hinged at some distance from their rear ends to the forward ends of the side bars, having eye-straps $c$ on their rear ends, the bolts $d$, secured to the axle, and passing freely through eye-straps $c$, and the springs $e$ on bolts $d$, as and for the purpose specified.

CHARLES A. FOSTER.

Witnesses:
CHARLES F. SHUEY,
F. M. FOSTER.